(12) United States Patent
Pruitt et al.

(10) Patent No.: US 7,845,168 B2
(45) Date of Patent: Dec. 7, 2010

(54) METHOD FOR CONTROLLING A POWERTRAIN

(75) Inventors: Randall Dean Pruitt, Washington, IL (US); Matthew Justus Miller, Lafayette, IN (US)

(73) Assignee: Caterpillar Inc, Peoria, IL (US)

( * ) Notice: Subject to any disclaimer, the term of this patent is extended or adjusted under 35 U.S.C. 154(b) by 426 days.

(21) Appl. No.: 11/984,706

(22) Filed: Nov. 21, 2007

(65) Prior Publication Data
US 2008/0125286 A1 May 29, 2008

(30) Foreign Application Priority Data
Nov. 24, 2006 (EP) .................. 06124775

(51) Int. Cl.
*F16H 61/00* (2006.01)
*B60K 23/00* (2006.01)
(52) U.S. Cl. .......................... 60/431; 701/54
(58) Field of Classification Search .......... 60/423, 60/431; 701/54
See application file for complete search history.

(56) References Cited
U.S. PATENT DOCUMENTS 3,988,893 A * 11/1976 Bojas et al. .............. 60/435
5,575,737 A 11/1996 Weiss
5,592,817 A * 1/1997 Nishimura et al. ............ 60/431
7,204,085 B2 * 4/2007 Bright et al. ................. 60/423
7,661,266 B2 * 2/2010 Essig ......................... 60/431
2006/0155452 A1 7/2006 Strenkert
2007/0276570 A1 * 11/2007 AbuSamra .................. 701/54

FOREIGN PATENT DOCUMENTS

DE 10 2004 021 575 12/2005
GB 2 025 583 1/1980

OTHER PUBLICATIONS

European Search Report and Opinion dated Apr. 19, 2007, for Application No. 06124775.5 (9 pages).

* cited by examiner

*Primary Examiner*—Thomas E Lazo
(74) *Attorney, Agent, or Firm*—Finnegan, Henderson, Farabow, Garrett & Dunner LLC

(57) ABSTRACT

A method for controlling a powertrain is disclosed. The powertrain includes a work arrangement, an engine for providing power to the work arrangement, and a transmission for transmitting power from the engine to the work arrangement. The method includes determining an efficient speed range of the transmission, determining at least one parameter indicative of a speed of the transmission, determining if the speed corresponds to the efficient speed range of the transmission, and adjusting the engine output in response to determining if the speed corresponds to the efficient speed range of the transmission.

20 Claims, 2 Drawing Sheets

METHOD FOR CONTROLLING A POWERTRAIN

TECHNICAL FIELD

This disclosure relates to powertrains and, more particularly, to methods for controlling a powertrain.

BACKGROUND

Current and future noise and emissions legislation is a contributing factor to the increasing complexity of machines, such as, for example, excavators, tracked type tractors, etc. The complexity may lead to an increasing parts count requiring additional space on the machines and possibly an enlargement of the machine's envelope.

Simultaneously, cooling systems face high demands to accurately control engine and other component temperatures for complying with noise and emissions legislation, constrained by a desire to keep dimensions to a minimum to achieve relatively small machine envelopes or to allow additional components to be housed or mounted without becoming an obstruction to operator vision.

Cooling system size is very much dependent on the heat output of the engine requiring cooling, so an efficient system may allow the use of a smaller cooling package.

The disclosed method and powertrain are directed toward improvements in the existing technology.

SUMMARY OF THE DISCLOSURE

One aspect of the disclosure relates to a method for controlling a powertrain, the powertrain including a work arrangement, an engine for providing power to the work arrangement, and a transmission for transmitting power from the engine to the work arrangement. The method includes determining an efficient speed range of the transmission, determining at least one parameter indicative of a speed of the transmission, determining if the speed corresponds to the efficient speed range of the transmission, and adjusting the engine output in response to determining if the speed corresponds to the efficient speed range of the transmission.

DETAILED DESCRIPTION

Figure 1:
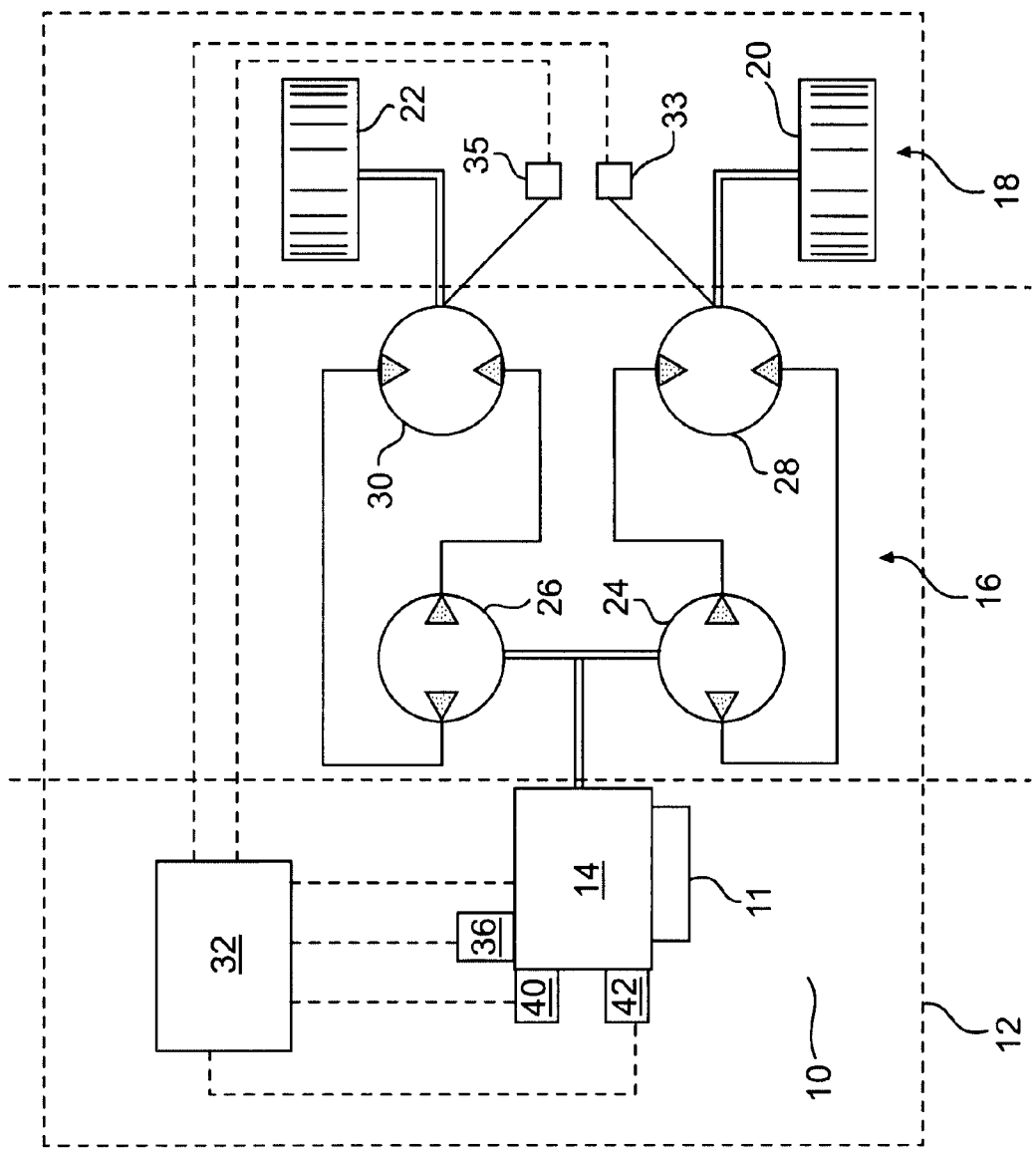
FIG. 1 is a diagrammatical representation of a machine having a powertrain adapted for being controlled by a method in accordance with the current disclosure.

With reference to FIG. 1, a machine 12 may have a cooling system 11 and a powertrain generally designated as 10. The powertrain may include a power source such as an internal combustion engine 14 and may be connected with a driving means such as a transmission 16 for transmitting power from the engine 14 to a work arrangement 18. The cooling system 11 may be configured to cool engine 14, but may in addition provide cooling to other portions of the powertrain 10 and the machine 12.

In this particular embodiment the work arrangement 18 may be adapted to propel the machine 12 by means of a first drive member 20 and a second drive member 22 mounted on opposite sides of the machine 12, but in other applications the work arrangement may be a tool drive, a generator, or another driven arrangement. The drive members 20, 22 may be tracks, wheels, or any other suitable propulsion device. The transmission 16 may be a dual path transmission having first and second hydrostatic pumps 24 and 26 for providing pressurized fluid to first and second motors 28 and 30, respectively. However, the transmission 16 may be of any other suitable configuration, such as a single pump driving both motors, or a mechanical gearbox with or without a fluid based transmission portion, such as a hydrostatic component, a hydrodynamic fluid coupling, or a fluid operated coupling.

The speed of both the first and second drive members 20 and 22 may be controlled in any suitable manner, such as, for example, by adjusting engine speed or the swash angle of any of the pumps or motors 24, 26, 28 and 30. The speed control operation may be of any suitable actuation type, such as manual, fluid or electronic, whereby the latter may include use of an electronic control unit (ECU) 32. The ECU 32 may be a single unit, but may also be a network of multiple units, if preferred. In the embodiment shown in FIG. 1, the ECU 32 may be a single unit connected to all portions of the powertrain for receiving and/or transmitting data and/or commands.

The powertrain may be provided with at least one sensor in communication with the ECU 32. In the illustrated embodiment, the powertrain has first and second speed sensors 33 and 35 for sensing and transmitting speed related data to the ECU 32. The first and second speed sensors 33 and 35 may be fitted at any suitable position in the powertrain 10 to sense the speed or rotational speed of any suitable component of the powertrain 10. In one embodiment the speed sensors 33 and 35 may be fitted on, adjacent to, or in between the motors 28, 30 and the drive members 20, 22. In one embodiment the speed sensors 33 and 35 may be fitted in the housing of the motors 28 and 30 such that they sense the speeds of the output shafts of the motors 28 and 30. The speed data from the speed sensors 33 and 35 may provide the ECU 32 with at least one parameter indicative of a speed of at least one component of the transmission 16, for example the speed sensors 33 and 35 may provide the ECU 32 with data relating to the speed of the output shafts of the motors 28 and 30.

In one embodiment the provision of additional speed sensors (not shown) in the powertrain, for example in the transmission, may enable the ECU 32 to determine the efficiency of the powertrain by comparing input and output data of the transmission 16. In another embodiment, transmission efficiency may be determined by measuring waste heat generation during operation.

In another embodiment the efficiency data may be known already, for example, from manufacturing or test data, and may be stored somewhere on the machine 10, for example in the ECU 32. By determining a speed of at least one component of the transmission 16, the ECU 32 may be able to determine if the transmission 16 is operating in a speed range corresponding to a particular efficiency window. An efficiency window may be defined as a certain speed range in which the transmission 16 operates at, or above, a level in which the efficiency is of a required magnitude. This may be expressed, for example, as a speed range in which the transmission 16 generates a relatively low amount of excess heat. Within that efficiency window, a specific point of peak efficiency may be identified. The data describing the efficiency window may be stored in the ECU 32.

In one embodiment the internal combustion engine 14 may have a fuel system 36 that may be controlled electronically via, for example, the ECU 32. The ECU 32 may contain at least one fuelling map for controlling the fuel system 36 by influencing performance parameters, such as injected fuel quantity, injection duration, multiple injection patterns, and rate shaping. By influencing one or all of these parameters the engine output may be adjusted. It is to be understood that in this context the term fuelling map may be interpreted as a power map or a torque map, since power output and torque output of the engine 14 are closely linked to the fuelling of the engine 14.

Figure 2:
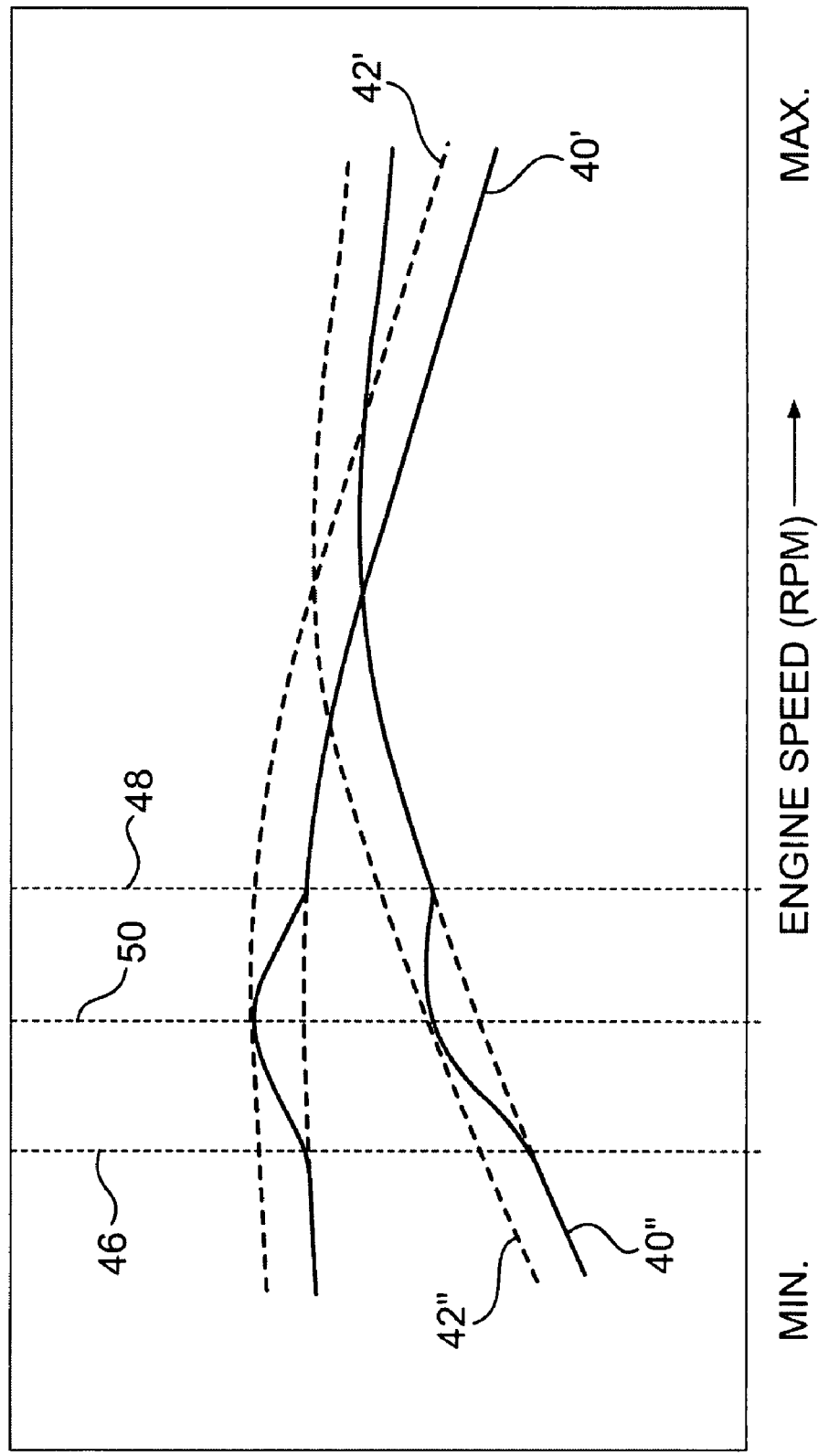
FIG. 2 is a diagrammatical representation of an exemplary fuelling map suitable for controlling the machine of FIG. 1.

An exemplary fuelling map is shown in FIG. 2 where the horizontal axis represent the engine speed and the efficiency window of the transmission corresponds to that range of engine speeds that fall within the boundaries 46 and 48. In one embodiment the ECU 32 may contain or use only a single fuelling map 40, but in another embodiment the ECU 32 may contain at least a first and a second fuelling map 40 and 42. For clarity, the power map and the torque map corresponding to the first fuelling map 40 are designated as the first torque map 40' and the first power map 40". Similarly, the second torque map 42' and the second power map 42" correspond to the second fuelling map 42.

Where the ECU 32 contains or uses a single fuelling map 40 the ECU 32 may be able to uprate or derate this fuelling map. Uprating or derating the fuelling map means in this context that the ECU 32 is capable of adjusting a fuel parameter such that a higher or lower engine output may be achieved, be it expressed in power output, torque output, or both. In an embodiment wherein the ECU 32 contains at least a first fuelling map 40 and a second fuelling map 42, the fuelling strategy may involve switching or interpolating between the at least first and second fuelling maps 40 and 42.

It is again to be understood that the term fuelling map may be interpreted as referring to a power map or a torque map. It is also to be understood that in this context, either uprating or derating a single fuelling map may have the same operational effect as switching between a first and a second fuelling map.

INDUSTRIAL APPLICABILITY

An exemplary description of the method for controlling a powertrain 10 of a machine 12 may be as follows. Although this example relates to propelling a machine 10, the principle may, equally be applied to a powertrain for a stationary machine.

The machine 12 may have a powertrain 10 that has a predetermined efficiency window in which the efficiency of that powertrain may be particularly good, and hence the cooling system 11 is not required to cope with large quantities of excessive waste heat from either the engine 14, the powertrain 10, or both. The cooling system 11 may be designed such that it can cope with any waste heat normally generated by the engine 14, the powertrain 10, or both, even when the powertrain 10 is at its least efficient. This may therefore result in the cooling system 11 having spare cooling capacity in that portion of the operating window wherein the powertrain 10 runs more efficiently. The power output of the engine 14 may therefore be increased without risking overloading the cooling system 11.

It is to be understood that the power output may be interpreted as being an available power output, because not in all instances may the full available power output be utilized. The efficiency window of the transmission 16 may be represented as the speed range corresponding to the engine speed range between the boundaries 46 and 48.

The efficiency may be expressed as a function of drive member speed whereby the efficiency window may be defined, for example, as the window wherein the drive member speeds correspond to a theoretical lower machine speed of 3 kph and a theoretical upper machine speed of 7 kph. A drive member speed corresponding to a theoretical machine speed of 5 kilometers per hour may be considered to correspond to peak efficiency. The boundaries 46 and 48 in that embodiment may be considered to correspond to drive member speeds of 3 kph and 7 kph respectively with the engine speed 50 corresponding to a peak efficiency of the transmission 16. It is to be noted that these values are exemplary only and may be varied as preferred. It is also to be noted that theoretical machine speed and actual machine speed may differ due, for example, to the drive members slipping or the machine turning.

During operation of the machine 12 the engine 14 may power the pumps 24, 26, which in turn may drive the motors 28, 30 and the drive members 20, 22. The pumps 24, 26 and motors 28, 30 may be adjusted simultaneously so as to output a desired speed and torque and propel the machine 12 in a substantially straight line. A change in machine direction may be induced by allowing one of the drive members 20, 22 to run slower than, or in the opposite direction of, the other one of the drive members 20, 22. The machine 12 may also change direction due to unequal slippage between the drive members 20, 22 relative to the surface with which they engage.

The engine 14 may be controlled by the ECU 32 which, in this example, may be provided with the first and second fuelling maps 40 and 42 and which may result in a performance chart as shown in FIG. 2. In this example the second fuelling map 42 may be equal to the first fuelling map 40 plus 5%. This may for example translate in a first torque map 40', a second torque map 42', a first power map 40" and a second power map 42". The maps display similar curves but the second torque map 42' and the second power map 42" are 5% higher than the first torque map 40' and the first power map 42', respectively. For convenience only the power maps 40" and 42" will be discussed further, but it is to be understood that the principle equally applies to the torque maps 40' and 42'.

The ECU 32 may monitor the drive member speeds of the drive members 20, 22 via the first and second speed sensors 33, 35. The ECU 32 may be programmed to determine a maximum, a minimum, or an average of the two drive member speeds.

In one embodiment the ECU 32 may determine the maximum of the two drive member speeds and determine if this corresponds to the efficiency window of the powertrain. If it is determined that the maximum of the two drive member speeds falls within a range corresponding to the efficiency window of the powertrain, the ECU 32 may control the engine 12 using the higher fuelling map 42 such that the engine power output is greater. Due to the powertrain 10 operating in an efficient state the additional power from the engine 14 may then be used without generating excessive waste heat that would overload the cooling system 11. The ECU 32 may at some point determine that the maximum of the two drive member speeds is outside a range corresponding to a particularly efficient operating range of the powertrain 10 and the ECU 32 may then change control of the engine 12 to the first torque map 40'. Alternatively the ECU may control the engine output by adopting a torque map intermediate of the first and the second torque maps 40', 42'.

In another embodiment wherein the ECU 32 has a single fuelling map available, the ECU 32 may be configured to adapt the fuelling map by derating or uprating it. The same principle applies as to an ECU 32 with two fuelling maps, wherein in the example with a single fuelling map 40, the maximum of the two drive member speeds may be determined and the ECU 32 may uprate or derate the single fuelling map 40 instead of changing over to a different fuelling map.

In one embodiment the operation of the system may be described as follows. The machine 12 may accelerate slowly from standstill to 10 kph, for example, in an approximately straight line. Both the drive members 20 and 22 may rotate at approximately the same speed although slight or temporary differences may be present due to different loads on the drive members and system variations. The ECU 32 may receive data from the first and second speed sensors 33 and 35 and may determine the maximum of the two drive member speeds. The ECU 32 may compare the determined maximum drive member speed with efficiency data stored in the ECU 32. As soon as one of the two drive members 20, 22 reaches a speed of 3 kph, the ECU 32 may increase the power output of the engine 12 relative to the power output as governed by the first fuelling map 40. This may be a relatively sudden step by increasing the output with a full 5%, or this may be increased over a speed range so that a 5% increase is achieved only when the maximum of the two drive member speeds is 5 kph.

In other words, the ECU 32 may be able to select either power map or interpolate dynamically between the power maps 40" and 42". This is shown in FIG. 2, wherein the first power map 40" deviates from its normal line and bulges upwards between the boundaries 46 and 48 peaking at the engine speed corresponding to the peak efficiency speed of the transmission 16. Once the 5 kph mark has been exceeded the ECU 32 may gradually reduce the increased power output such that no additional power is added to the first fuelling map at 7 kph.

It is to be understood that the maps and windows are not restricted to the exemplary figures given above. The principle is applicable to a wide range of powertrains and may therefore be tailored as desired. For example, the lower speed limit may be determined as a function of drive member slip and wear, i.e., adding more power at lower drive member speeds may increase drive member slip and may therefore not be desirable. Furthermore, the ECU 32 may be programmed to cause sudden increases and decreases in power output or it may increase and decrease the power gradually so that it gradually moves towards maximum and minimum power outputs. The end result of the switching of the fuelling maps or the uprating and derating of the fuelling maps may therefore be depicted as a drawbar power curve having a permanent bulge in the section of the map corresponding to the efficiency window of the powertrain 10.

Although some embodiments have been described herein, it will be apparent to those skilled in the art that various modifications and variations can be made to the disclosed method and powertrain without departing from the scope of the disclosure. Other embodiments will be apparent to those skilled in the art from consideration of the specification and practice of the disclosed embodiments. It is intended that the specification and examples be considered as exemplary only with the true scope of protection being indicated by the following claims.

The invention claimed is:

1. A method for controlling a powertrain, the powertrain including a work arrangement, an engine for providing power to the work arrangement and a transmission for transmitting power from the engine to the work arrangement, the method comprising:
   determining at least one parameter indicative of an output speed of the transmission;
   determining if the output speed of the transmission is within a stored output speed range of the transmission; and
   controlling an engine output characteristic based on the output speed of the transmission according to a first mode when the output speed is within the output speed range and according to a second mode when the output speed is outside the output speed range, the first mode being different from the second mode.

2. The method according to claim 1, wherein controlling the engine output characteristic according to the second mode includes derating a fuelling map if the output speed is outside the output speed range of the transmission.

3. The method according to claim 1, wherein controlling the engine output characteristic according to the first mode includes uprating a fuelling map if the output speed is within the output speed range of the transmission.

4. The method according to claim 1, wherein controlling the engine output characteristic includes switching from a first fuelling map associated with the first mode to a second fuelling map associated with the second mode.

5. The method according to claim 1, wherein controlling the engine output characteristic includes modifying an engine torque map to change from the first mode to the second mode, and controlling the engine electronically using the modified engine torque map when controlling the engine output characteristic according to the second mode.

6. The method according to claim 1, wherein the transmission includes at least one hydrostatic pump and at least one hydrostatic motor, and the at least one parameter indicative of the output speed includes a speed of at least one of the at least one pump and or the at least one motor.

7. The method according to claim 1, wherein:
   the at least one parameter includes a speed of rotation of a component of the work arrangement; and
   determining the at least one parameter includes using at least one sensor to determine the speed of rotation of the component of the work arrangement.

8. The method according to claim 1, wherein:
   the at least one parameter includes a speed of rotation of a component of the transmission; and
   determining the at least one parameter includes using at least one sensor to determine the speed of rotation of the component of the transmission.

9. The method according to claim 1, wherein the work arrangement includes first and second drive members on opposite sides of the machine, and determining the at least one parameter includes determining the speeds of the first and the second drive members.

10. The method according to claim 9, wherein determining the at least one parameter includes determining at least one of a maximum, a minimum, or an average value of the speeds of the first and the second drive members.

11. The method of claim 1, wherein the output speed range is a range of output speeds of the transmission at which the transmission generates a lower amount of excess heat than when operating outside the output speed range.

12. A powertrain for a machine, the powertrain comprising:
   a work arrangement;
   an engine configured to provide power to the work arrangement;
   a transmission configured to transmit power from the engine to the work arrangement;
   at least one speed sensor configured to determine at least one parameter indicative of an output speed of the transmission; and
   an electronic control unit configured to:
      store data relating to a output speed range of the transmission,
      determine if the output speed of the transmission is within the output speed range, increase a power output of the engine in response to the electronic control unit determining that the at least one parameter is within the output speed range, control an engine output characteristic based on a first relationship between the engine output characteristic and the output speed of the transmission when the output speed is within the output speed range, and control the engine output characteristic based on a second relationship between the engine output characteristic and the output speed of the transmission when the output speed is outside the output speed range, the first relationship being different from the second relationship.

13. The powertrain according to claim 12, wherein the electronic control unit is provided with a first fuelling map for controlling the engine output characteristic based on the first relationship, the electronic control unit being configured to uprate the fuelling map when the output speed is within the output speed range of the transmission.

14. The powertrain according to claim 12, wherein the electronic control unit is provided with a first fuelling map for controlling the engine output characteristic based on the second relationship, the electronic control unit being configured to derate the fuelling map when the output speed is outside the output speed range of the transmission.

15. The powertrain according to claim 12, wherein the electronic control unit is provided with a first fuelling map for controlling the engine output characteristic based on the first relationship and a second fuelling map for controlling the engine output characteristic based on the second relationship, the electronic control unit being configured to switch from the first fuelling map to the second fuelling map when the output speed is outside the output speed range of the transmission.

16. The powertrain according to claim 12, wherein the work arrangement includes a first drive member and a second drive member, and the electronic control unit is configured to determine at least one of a maximum, a minimum, or an average speed of the first and the second drive members, and determine the at least one parameter based on the at least one determined maximum, minimum, or average speed.

17. A machine, comprising,
a work arrangement;
an engine configured to provide power to the work arrangement;
a transmission configured to transmit power from the engine to the work arrangement;
at least one speed sensor configured to determine at least one parameter indicative of an output speed of the transmission; and
an electronic control unit configured to:
store data relating to a output speed range of the transmission,
determine if the output speed of the transmission is within the output speed range, and
control an engine output characteristic based on the output speed of the transmission according to a first mode when the output speed is within the output speed range and according to a second mode when the output speed is outside the output speed range;
wherein the first mode and the second mode are distinguished based on an amount of excess heat generated by the transmission when operating in the respective modes.

18. The machine of claim 17, wherein the work arrangement includes first and second drive members.

19. The machine of claim 17, wherein the electronic control unit is configured to control at least one fuel injection parameter to control the engine output characteristic.

20. The machine of claim 19, wherein the at least one fuel injection parameter includes at least one of fuel quantity, injection duration, injection pattern, or rate shape.

* * * * *